(12) United States Patent
Park

(10) Patent No.: US 6,801,709 B1
(45) Date of Patent: Oct. 5, 2004

(54) APPARATUS AND METHOD FOR SYNCHRONOUSLY DECODING VIDEO DATA AND SUB-PICTURE DATA IN DVD PLAYER

(75) Inventor: Pan-Gie Park, Suwon-shi (KR)

(73) Assignee: Samsung Electronics Co., Ltd., Suwon-si (KR)

(*) Notice: Subject to any disclaimer, the term of this patent is extended or adjusted under 35 U.S.C. 154(b) by 577 days.

(21) Appl. No.: 09/118,922

(22) Filed: Jul. 20, 1998

(30) Foreign Application Priority Data

Jul. 19, 1997 (KR) .............................. 97-33874

(51) Int. Cl.[7] .................... H04N 5/781; H04N 5/85; H04N 5/90; H04N 5/91; H04N 7/04; H04N 7/06; H04N 7/08; H04N 7/52

(52) U.S. Cl. ..................... 386/68; 386/95; 386/125

(58) Field of Search ............................. 386/6, 33, 45, 386/68, 69, 82, 95, 98, 125, 126

(56) References Cited

U.S. PATENT DOCUMENTS

| | | | |
|---|---|---|---|
| 5,731,847 A | * 3/1998 | Tsukagoshi | 348/589 |
| 5,758,007 A | * 5/1998 | Kitamura et al. | 386/45 |
| 5,815,634 A | * 9/1998 | Daum et al. | 386/96 |
| 5,848,217 A | * 12/1998 | Tsukagoshi et al. | 386/68 |
| 5,930,450 A | * 7/1999 | Fujita | 386/95 |
| 5,999,698 A | * 12/1999 | Nakai et al. | 386/125 |
| 6,160,952 A | * 12/2000 | Mimura et al. | 386/95 |

* cited by examiner

Primary Examiner—Thai Tran
Assistant Examiner—Polin Chieu
(74) Attorney, Agent, or Firm—Staas & Halsey LLP

(57) ABSTRACT

A method and apparatus for decoding sub-picture data and MPEG video data in an A/V decoder of a DVD player. The method prevents mismatches between sub-picture data and MPEG video data during a fast replay mode by synchronizing a decoding operation of the MPEG video data with a decoding operation of the sub-picture data. The method includes the steps of updating a system clock reference value with a presentation time stamp value during decoding of video data, extracting a display control sequence from a searched sub-picture unit, comparing a command executing start time in the display control sequence with the system clock reference value, and skipping the current display control sequence if the updated system clock reference value is greater than the command executing start time, otherwise, waiting until the updated system clock reference value is equal to the command executing start time and then executing the display control sequence in the searched sub-picture unit.

13 Claims, 5 Drawing Sheets

| | I | B | B | P | B | B | P | B | B | P | B | B | P | B | B | I | B | B | P | B | B | P | B | B | P | B | B | P | B | B |
|---|---|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |

↞——— 1 SECOND ———↠

FIG. 3

APPARATUS AND METHOD FOR SYNCHRONOUSLY DECODING VIDEO DATA AND SUB-PICTURE DATA IN DVD PLAYER

CROSS REFERENCE TO RELATED APPLICATION

This application claims the benefit of Korean Application No. 33874/1997, filed Jul. 19, 1997, in the Korean Patent Office, the disclosure of which is incorporated herein by reference.

BACKGROUND OF THE INVENTION

The present invention relates to a DVD (Digital Video Disc) player, and more particularly to a method for decoding video data at high speed, while maintaining synchronization between sub-picture data and MPEG (Motion Picture Experts Group) video data.

Multimedia information mainly comprises massive amounts of video data and audio data. When multimedia information is processed using PCM (Pulse Code Modulation), there may arise difficulty in recording and transmitting the massive amounts of data. Therefore, effective compression technologies for video and audio data will play a key role in realizing the multimedia era. It is expected that the real multimedia era will commence with the widespread adoption of the MPEG-2 standard and the AC-3 audio compression technique. The MPEG-2 standard is an international standard for compressing/multiplexing video and audio data. Particularly, MPEG-2 can reproduce images having a high resolution, as high as that in existing analog TVs, at a data transfer rate below 10 Mbps. For audio applications, the newly developed AC-3 audio compression technique can reproduce multi-channel audio data, so that one can enjoy high quality multi-channel sound at home.

At the present time, DVD recorders for recording compressed video and audio data and DVD players are rapidly becoming popular. A DVD player includes an A/V (Audio/Video) decoder for decoding compressed video and audio data. In known A/V decoders, when operating in a fast replay mode, sub-picture data is not synchronized with the MPEG video data. Thus, the sub-picture data and the MPEG video data are undesirably reproduced independently.

SUMMARY OF THE INVENTION

Accordingly, an object of the invention is to provide a method for decoding MPEG video data and sub-picture data in synchronism with each other in an A/V decoder when reproducing MPEG video data and sub-picture data in a fast replay mode.

According to an aspect of the present invention, there is provided a method for decoding video data in a decoder which reproduces MPEG video data and sub-picture data simultaneously at high speed. The method includes the steps of sequentially searching pictures to be reproduced, decoding the searched picture, and displaying the decoded picture, wherein a system clock reference (SCR) value is updated with a presentation time stamp (PTS) value of the decoded picture, the system clock reference being used for synchronizing a sub-picture decoding operation with an MPEG video data decoding operation; sequentially searching sub-picture units to be reproduced, analyzing a display control sequence (SP_DCSQ) in the searched sub-picture unit to compare command executing start time information (SP_DCSQ_STM) in said display control sequence (SP_DCSQ) with said updated system clock reference (SCR) value, and skipping the current display control sequence if the updated system clock reference value is greater than the command executing start time information, otherwise, executing all commands display control sequence such that the respective display control sequence is executed when the updated system clock reference value is equal to the command executing start time information.

BRIEF DESCRIPTION OF THE DRAWINGS

The above and other objects, features and advantages of the present invention will become more apparent in the light of the following detailed description of a preferred embodiment thereof taken with the attached drawings in which:

FIG. 3 is a diagram illustrating a picture format of NTSC MPEG data;

DETAILED DESCRIPTION OF THE PREFERRED EMBODIMENT

A preferred embodiment of the present invention will be described in detail hereinbelow with reference to the attached drawings. Specific details are described in the specification and accompanying drawings to provide a comprehensive understanding of the present invention. However, anyone skilled in the art could implement the present invention without all the details. Accordingly, detailed description of known structures and methods used in the present invention are omitted lest it should obscure the subject matter of the present invention.

Figure 1:
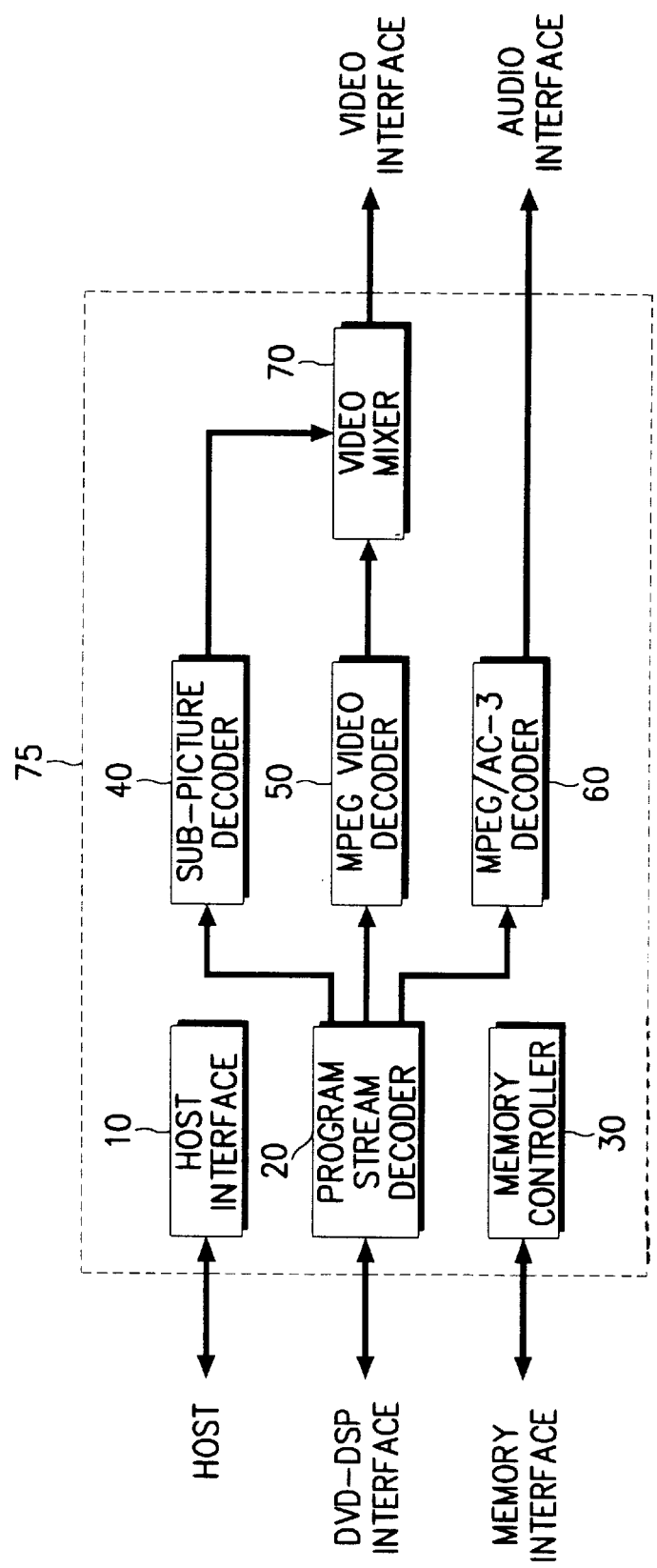
FIG. 1 is a block diagram of an A/V decoder.

FIG. 1 is a block diagram of an A/V decoder 75. A host interface 10 interfaces between the A/V decoder 75 and a signal from a host (not shown). A program stream decoder 20 decodes program stream data received from a DVD-DSP interface (not shown), and transfers decoded sub-picture to a sub-picture decoder 40, MPEG video data to an MPEG video decoder 50, and MPEG/AC-3 audio data to an MPEG/AC-3 decoder 60. A memory controller 30 interfaces between the A/V decoder 75 and a signal from an external memory (not shown). The external memory stores input data, decoding data and display data. A video mixer 70 mixes the sub-picture data output from the sub-picture decoder 40 with the MPEG video data output from the MPEG video decoder 50, to display a picture through a video interface (not shown). The MPEG/AC-3 decoder 60 decodes MPEG audio data or Dolby AC-3 audio data and outputs to an audio interface (not shown).

Figure 2:
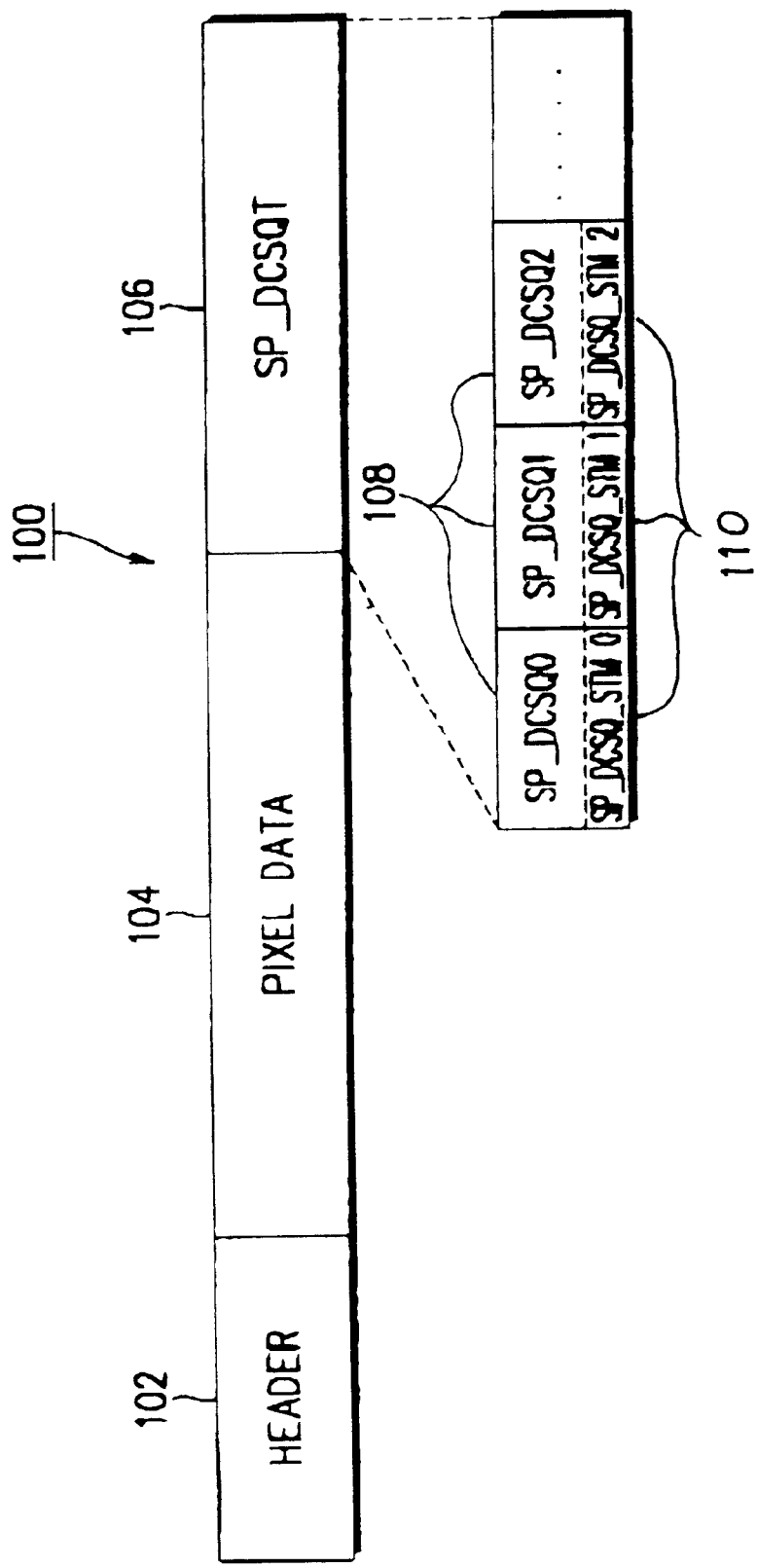
FIG. 2 is a diagram illustrating a data format of a sub-picture unit.

FIG. 2 is a diagram illustrating a data format of a sub-picture unit 100. The data format of a sub-picture unit 100, shown in FIG. 2, is the basic unit for decoding the sub-picture. As illustrated, the sub-picture unit 100 includes a header 102 having general information about the sub-picture unit 100, pixel data 104 created by compressing the sub-picture data, and a SP_DCSQT 106 (Sub-Picture Display Control Sequence Table). The SP_DCSQT 106 is comprised of a plurality of SP_DCSQs 108 (Sub-Picture Display Control Sequence, for example: SP_DCSQ0, SP_DCSQ1, SP_DCSQ2, . . . SP_DCSQn) each having display control commands for the sub-picture data and time information indicating an execution time of the display control commands. Generally, the SP_DCSQ 108 includes information such as a display time of the sub-picture, compulsive display information (regardless of the display time), a display completion time of the sub-picture, color designation information for each pixel, a pixel contrast value determining a mixing rate with other video data, display area information of the sub-picture data, positional information of the compressed pixel data, color/contrast change information for changing the color and contrast value of the pixel in a specific area, etc. In accordance with the preferred embodiment of the present invention, each SP_DCSQ 108 is provided with SP_DCSQ_STM 110 which contains time information indicating an execution time of the command within the SP_DCSQ 108 (for example, SP_DCSQ0 has an SP_DCSQ_STM0 and SP_DCSQ1 has an SP_DCSQ_STM1). The SP_DCSQ_STM 110 is used for synchronizing the audio, video and sub-picture data.

FIG. 3 is a diagram illustrating a picture format of NTSC MPEG data. A data format of NTSC MPEG video data generally comprises three types of pictures: I (Intra), P (Predictive), and B (Bidirectionally predictive). Basically, the displayed picture is divided into I, P, and B pictures. In case of displaying 30 frames per second, the MPEG video data for each second typically includes two I picture frames, eight P picture frames, and twenty B picture frames. The I pictures are decoded without referring to other pictures as they are encoded using all of the information contained in a picture. The P pictures are encoded using forward-predicting information about the previous I or P picture. The P pictures are decoded for picture data used in conjunction with forward prediction. The B pictures are encoded by predicting, bidirectionally, information about the previous and next pictures (I or P). The B pictures are decoded when there are two pictures which are predicted bidirectionally during decoding. In realizing a fast replay mode, like in a VCR (Video Cassette Recorder), only the I pictures are displayed. Alternatively, the I and P pictures (but not the B pictures) may be reproduced, using the I picture as a random access unit.

Figure 4:
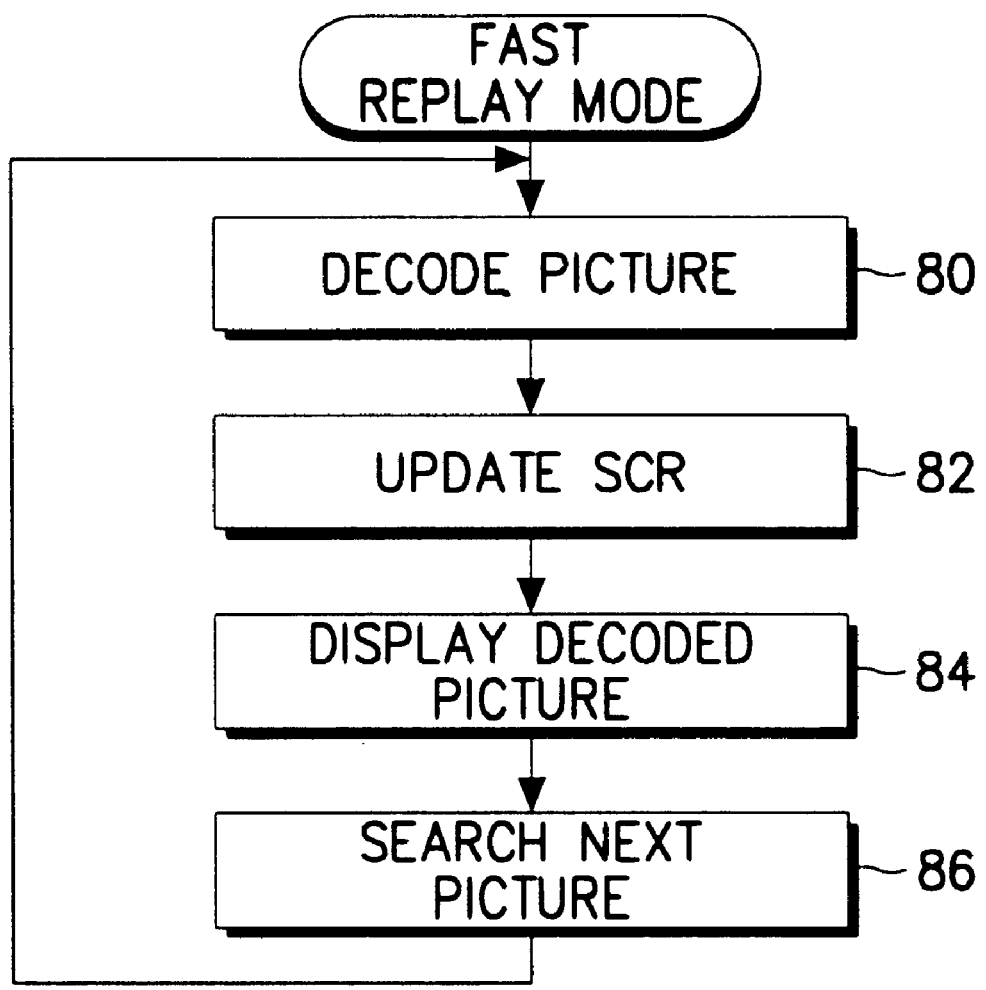
FIG. 4 is a flowchart for decoding MPEG video data in the fast replay mode according to a preferred embodiment of the present invention.

FIG. 4 is a flow chart for decoding the MPEG video data in the fast replay mode according to a preferred embodiment of the present invention. First, at step 80, the MPEG video decoder 50 decodes a picture in the fast replay mode. Next in step 82, the MPEG video decoder 50 updates a SCR (System Clock Reference) value, used for synchronizing the MPEG video data with the sub-picture data. The SCR value is updated with a PTS (Presentation Time Stamp) value indicating the presentation time of the picture decoded at the step 80. The SCR value is continuously updated (increased) throughout the process. Next, in step 84, the MPEG video decoder 50 displays the decoded picture. Then, in step 86, the MPEG video decoder 50 searches for the next picture to be decoded in the fast replay mode. After searching for the next picture, the MPEG video decoder 50 returns to step 80 to repeat the above described process, thereby reproducing the MPEG video data at high speed.

Figure 5:
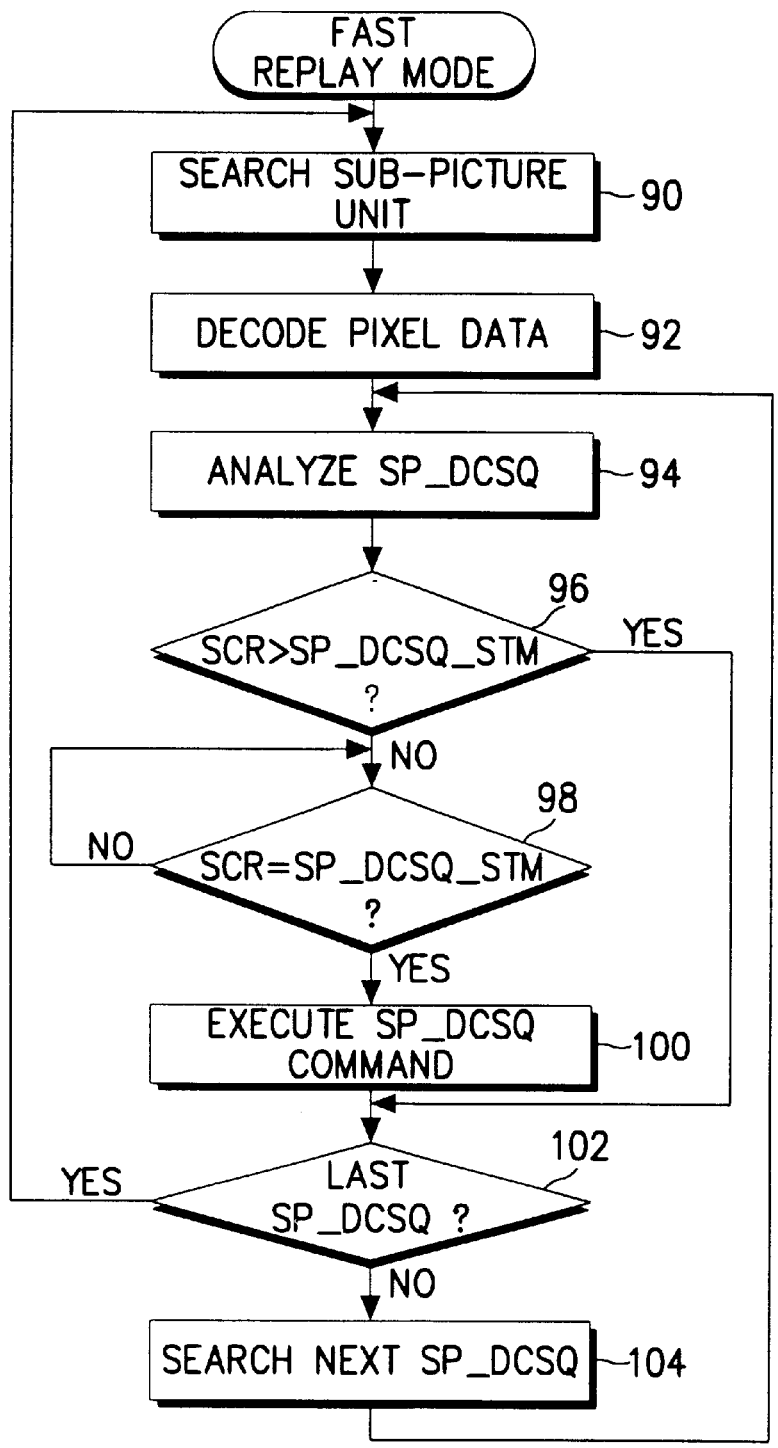
FIG. 5 is a flowchart for decoding sub-picture data in the fast replay mode according to a preferred embodiment of the present invention.

FIG. 5 is a flow chart for decoding the sub-picture data in the fast replay mode according to the preferred embodiment of the present invention. First, at step 90, the sub-picture decoder 40 searches for the sub-picture unit 100 to be reproduced in the fast replay mode. Next, in step 92, the sub-picture decoder 40 decodes the pixel data encoded in the sub-picture unit 100 using a run-length method. Then, in step 94, the sub-picture decoder 40 analyzes information in the first SP_DCSQ 108 (typically SP_DCSQ0) of the sub-picture unit 100. Specifically, the sub-picture decoder 40 extracts the SP_DCSQ_STM 110 (SP_DCSQ_STM0 for the SP_DCSQ0), indicating the execution time information of the command within the first SP_DCSQ 108 (SP_DCSQ0). Thereafter, in step 96, the sub-picture decoder 40 compares the SP_DCSQ_STM 110 (SP_DCSQ0) value with the SCR value updated by the MPEG video decoder 50. If the SCR value is greater than the SP_DCSQ_STM 110 value, the time for executing the commands corresponding to the first SP_DCSQ 108 is over. The sub-picture decoder 40 skips the current SP_DCSQ 108 to process the next SP_DCSQ 108 (for example, SP_DCSQ1) by going to step 102. On the other hand, if the SCR value is less than the SP_DCSQ_STM 110 value, the currently decoded MPEG video data precedes the sub-picture data. The sub-picture decoder 40 waits in a loop at step 98 until the SCR value is equal to the SP_DCSQ_STM 110 value. When the SCR value is equal to the SP_DCSQ_STM 110 value in step 98, the process goes to step 100 and the sub-picture decoder 40 executes the command in the SP_DCSQ 108 and the process goes to step 102.

In step 102, it is checked whether the current SP_DCSQ 108 is the last SP_DCSQ 108 in the current sub-picture. If the current SP_DCSQ 108 is not the last SP_DCSQ 108, then the process goes to step 104 and the sub-picture decoder 40 searches for the next SP_DCSQ 108 (for example, SP_DCSQ1) to be processed. Thereafter, the process returns to step 94 to process the next SP_DCSQ 108.

If, however, in step 102, the current SP_DCSQ 108 is the last SP_DCSQ 108, then the process returns to step 90 to search for the next sub-picture unit 100 and repeats the above described process for the next sub-picture unit 100, thereby reproducing the sub-picture data in synchronism with the MPEG video data.

As described above, an A/V decoder, according to the preferred embodiment of the present invention causes the sub-picture data decoding operation to coincide with the MPEG video data decoding operation, thereby synchronizing the sub-picture data with the MPEG video data. In this way, it is possible to reproduce the MPEG video data with the sub-picture data at high speed, keeping the synchronization between those video data.

The preferred embodiment, described above, is given by way of example only for explaining the use and construction of the present invention. The embodiments are subject to routine modification by those of ordinary skill in the art. The present invention is not limited to the illustrative embodiments, but rather is defined by the appended claims.

What is claimed is:

1. A method for decoding DVD video which reproduces MPEG video data and sub-picture data simultaneously at high speed, comprising:

updating a system clock value with a presentation time stamp value during decoding of the video data;

extracting a display control sequence from a sub-picture unit;

comparing a command executing start time in the display control sequence with the updated system clock value; and skipping the display control sequence if the updated system clock value is greater than the command executing start time, otherwise, waiting until the updated system clock value is equal to the command executing start time and then executing the display control sequence in the searched sub-picture unit.

2. A program for controlling a DVD player comprising the functions:
   updating a system clock value with a presentation time stamp value during decoding of video data;
   extracting a current display control sequence from a sub-picture unit;
   comparing a command executing start time in the current display control sequence with the system clock value; and
   skipping the current display control sequence if the updated system clock value is greater than the command executing start time, otherwise, waiting until the updated system clock value is equal to the command executing start time and then executing any commands in the current display control sequence.

3. A decoding apparatus for decoding video data and sub-picture data comprising:
   a video decoder that decodes picture data from the video data and then updates a system clock and outputs the picture data; and
   a sub-picture decoder that decodes the sub-picture data to obtain pixel data and a control sequence regarding the pixel data and a related start time for the control sequence, said sub-picture decoder comparing the start time to the updated system clock and when the updated system clock is less than the start time, waiting until the start time equals the updated system clock and then executing the control sequence to output a sub-picture in synchronism with the picture,
   wherein when the updated system clock is greater than the start time, the sub-picture decoder skips a current control sequence and retrieves a next control sequence.

4. A decoding apparatus, as set forth in claim 3, wherein the sub-picture data has a series of control sequences each having a display control command with a related start time.

5. A decoding apparatus, as set forth in claim 3, further comprising:
   a program stream decoder that receives a program stream, separates video data from the program stream for said video decoder, and separates sub-picture data from the program stream for said sub-picture decoder.

6. A decoding apparatus, as set forth in claim 5, wherein said program stream decoder also separates audio data from the program stream.

7. A decoding apparatus, as set forth in claim 5, further comprising:
   a video mixer that receives the picture data from said video decoder and the sub-picture from said sub-picture decoder and mixes the picture data with the sub-picture to produce a final picture for display.

8. A decoding apparatus, as set forth in claim 3, wherein the video data comprises MPEG data.

9. A decoding apparatus, as set forth in claim 8, wherein the MPEG data comprises MPEG-2 data.

10. A decoding apparatus, as set forth in claim 3, wherein the video data and the sub-picture are stored on a DVD.

11. A decoding apparatus, as set forth in claim 5, wherein the program stream is output from a DVD player.

12. A method of fast replay display comprising:
   separating picture data and sub-picture data from a program stream;
   selecting an I picture from the picture data;
   extracting a presentation time stamp for the selected I picture from the picture data;
   updating a system clock according to the presentation time stamp of the selected I picture;
   extracting an execution time of a first sub-picture from the sub-picture data;
   comparing the extracted execution time of the first sub-picture with the updated time of the system clock;
   displaying the first sub-picture based on the sub-picture data in synchronization with the selected I picture when the updated system clock becomes equal to the extracted execution time of the first sub-picture, and
   if, at a time of the comparison, the time of the updated system clock is greater than the extracted execution time of the first sub-picture, sequentially extracting respective execution times of additional sub-pictures and repeating the comparing of the extracted execution time of at least one additional sub-picture with the updated system clock and/or the displaying of the at least one additional sub-picture in like manner as the comparing and/or displaying of the first sub-picture.

13. A method of decoding video data and sub-picture data simultaneously at high speed, comprising:
   sequentially searching pictures to be reproduced;
   decoding one of the searched pictures;
   updating a system clock reference value with a presentation time stamp value of the decoded picture;
   displaying the decoded picture;
   sequentially searching sub-picture units to be reproduced;
   for each sub-picture unit, sequentially searching corresponding sub-picture display control sequences;
   comparing a command executing start time for a current display control sequence with the updated system clock reference value; and
   skipping the current display control sequence if the updated system clock reference value is greater than the command executing start time, otherwise, waiting until the updated system clock reference value is equal to the command executing start time and then executing the current display control sequence.

* * * * *